(12) United States Patent
Goossen

(10) Patent No.: US 6,307,983 B1
(45) Date of Patent: Oct. 23, 2001

(54) ROBOTIC OPTICAL CROSS-CONNECT

(75) Inventor: Keith W. Goossen, Aberdeen, NJ (US)

(73) Assignee: Lucent Technologies, Inc., Holmdel, NJ (US)

( * ) Notice: Subject to any disclaimer, the term of this patent is extended or adjusted under 35 U.S.C. 154(b) by 0 days.

(21) Appl. No.: 09/495,303

(22) Filed: Feb. 1, 2000

(51) Int. Cl.$^7$ .................................................. G02B 6/26
(52) U.S. Cl. .............................. 385/16; 385/19; 385/26; 385/135
(58) Field of Search .................................. 385/16, 17, 19, 385/24, 25, 26, 134, 135

(56) References Cited

U.S. PATENT DOCUMENTS

| | | | |
|---|---|---|---|
| 4,886,335 | 12/1989 | Yanagawa et al. | 350/96.2 |
| 4,955,686 | 9/1990 | Buhrer et al. | 350/96.2 |
| 5,345,446 | 9/1994 | Hiller et al. | 370/60.1 |
| 5,436,987 * | 7/1995 | Saito et al. | 385/16 |
| 5,586,112 | 12/1996 | Tabata | 370/225 |
| 5,613,021 * | 3/1997 | Saito et al. | 385/17 |
| 5,699,462 | 12/1997 | Fouquet et al. | 385/18 |
| 5,770,001 | 6/1998 | Nagayama et al. | 156/350 |
| 5,774,614 | 6/1998 | Gilliland et al. | 385/88 |
| 5,831,979 | 11/1998 | Byers | 370/360 |
| 5,937,117 | 8/1999 | Ishida et al. | 385/24 |
| 5,960,132 | 9/1999 | Lin | 385/18 |
| 5,970,749 | 10/1999 | Bloom | 65/378 |
| 5,999,290 | 12/1999 | Li | 329/127 |
| 6,005,998 | 12/1999 | Lee | 385/33 |
| 6,061,328 | 5/2000 | Read et al. | 370/216 |

* cited by examiner

Primary Examiner—Cassandra Spyrou
Assistant Examiner—Alessandro V. Amari

(57) ABSTRACT

A robotic optical cross-connect to operate with three motors irrespective of the number of input fibers. A preferred embodiment includes a ferrule loader arm operated by a first motor; a ferrule loader ring rotatably operated by a second motor; and a loading piston upon which the ferrule loader-ring is mounted. The first motor imparts a motion to the ferrule loader arm in a first direction. The loading piston imparts a motion to the ferrule loader ring in a second direction, the second direction being substantially orthogonal to the first direction. A plurality of connectorized patch fibers is connected at a first end (leaving a second end free) to a first fiber bundle arranged in a substantially circular fashion. A second fiber bundle is also arranged in a substantially circular fashion and is configured to receive connections from the free second end of the plurality of patch fibers. Ferrules are loaded from the ferrule loader arm onto the ferrule loader ring. By operating the second motor, the ferrule loader ring is rotated to an appropriate (arbitrary, prescribed) position within contact or within a free-space coupling region. Thereafter a connection between the fibers from the first fiber bundle and the second fiber bundle is established.

8 Claims, 5 Drawing Sheets

ROBOTIC OPTICAL CROSS-CONNECT

TECHNICAL FIELD

The present invention is related in general to the field of fiber optics, and in particular, to a robotic fiber optic cross-connect.

BACKGROUND

As voice calls or data are routed through a telecommunications network, the information travels through many fiber-optic segments, which are linked together using cross-connects. Typically, information (e.g., packets of data) is converted from light into an electronic signal, routed to the next circuit pathway, and then converted back into light as it travels to the next network destination.

An optical cross-connect (OXC) in the physical layer of an optical network is a fundamental building block used to terminate and administer communication circuits. An OXC allows the installation of new terminal equipment along an optical network. In general, connection points are established at the nodes of an optical network. New terminal equipment is coupled at these connection points. Typically, at the OXC, circuits are joined with patch cords, which are cables with connectors on each end. These patch cords could be configured as either simplex (one fiber per cable) or duplex (two fibers per cable).

Fiber optic connectors offer a mechanical means to terminate optical fibers to other fibers and to active devices, thereby connecting transmitters, receivers and cables into working links. Typically, optical fiber cables prepared, run, and thereafter terminated using well-known techniques such as splicing (typically used with single mode fibers) or connectorizing (commonly used with multi-mode fibers).

Splicing is a method of joining two bare fibers permanently together using a mechanical or a fusion splice. This method is generally used either to connect two cable runs together to make a run longer, or to add a pigtail connector—a short piece of cable with a factory-attached connector at one end—onto the cable. Splicing is typically done by carefully aligning the cores of the two fibers, and either fusing (melting) them with an electric arc, or by using a mechanical method wherein the fibers are glued or gripped together by means of a ferrule, which is a fiber optic connection component that holds a fiber in place and aids in its alignment.

Persons of ordinary skill in the art are aware of several methods of connectorizing. These methods include the following.

(a) Thermal Cure Epoxy method, which uses either heat-cure epoxy or five minute (ambient) epoxy to cure fiber into ferrule, and after curing, the fiber is scribed and polished to a fine flat end surface.

(b) Cleave and Crimp method, which uses a pre-loaded fiber stub into ferrule, allowing a user to prepare fiber and jacket and then cleave the fiber to a pre-established length, after which the fiber is inserted into a plug and crimped into place.

(c) Ultra Violet (UV) Adhesive method, which uses a technique similar to the thermal cure epoxy technique, with the exception that the fiber is bonded via a UV adhesive and the use of a UV source such as a UV lamp or sunlight to cure the epoxy.

(d) Epoxyless method, which uses a body technique where the fiber and cable are crimped to a plug body before mounting the plug into a tool that forces a plunger forward, forcing a resilient sphere to provide a compression-fit over the fiber.

A paper by Sjölinder entitled "Mechanical Optical Fibre Cross Connect" discloses a remotely operated fiber cross-connect (FXC) based on mechanical movements of fiber connecters. This FXC comprises linearly moving electric motors on two sides of a matrix base plate. The motors on one side of the matrix base plate move in a direction perpendicular to those on the other side and move the fiber to a certain position in the matrix. The motors assemble connectorized fibers together in what are called "locomotives," each of which locomotive contains two motors. This type of assembling forms a connection, which process is called "mating." After mating two ferrules together, which are previously assembled in a v-groove to form a "block", a force is applied to press the two ferrules closely together. This design has an advantage in that a connection that does not require a reconfiguration can stay in place while others are being reconfigured.

Sjölinder, however, requires 4N motors, where N is the number of input fibers, one for each ferrule. One of these motors is used to move the ferrule into position and one to perform the mating action. Thus, for a crossconnect with 256 inputs, Sjölinder requires 1024 motors. It would be advantageous to design a robotic optical crossconnect that requires fewer motors irrespective of the size of the crossconnect.

SUMMARY

A robotic optical crossconnect to operate with three motors irrespective of the number of input fibers. A preferred embodiment includes a ferrule loader arm operated by a first motor; a ferrule loader ring rotatably operated by a second motor; and a loading piston upon which the ferrule loader ring is mounted. The first motor imparts a motion to the ferrule loader arm in a first direction. The loading piston imparts a motion to the ferrule loader ring in a second direction, the second direction being substantially orthogonal to the first direction. A plurality of connectorized patch fibers is connected at a first end (leaving a second end free) to a first fiber bundle arranged in a substantially circular fashion. A second fiber bundle is also arranged in a substantially circular fashion and is configured to receive connections from the free second end of the plurality of patch fibers. Ferrules are loaded from the ferrule loader arm onto the ferrule loader ring. By operating the second motor, the ferrule loader ring is rotated to an appropriate (arbitrary, prescribed) position within contact or within a free-space coupling region. Thereafter a connection between the fibers from the first fiber bundle and the second fiber bundle is established.

In one embodiment, the present invention comprises a robotic optical cross-connect including an assembler, comprising a ferrule conveyor arm comprising a plurality of ferrules, the ferrule conveyor arm driven by a first motor in a first direction; a loading piston driven by a second motor in a second direction; and a ferrule-loader ring rotatably driven by a third motor, the ferrule loader ring mounted on the loading piston so as to receive a motion in the second direction; a first fixed fiber bundle arranged in a substantially circular fashion, the first fixed bundle comprising a first set of fibers, each one of the first set of fibers connectorized with a first type of connector at at least a first end; a second fixed fiber bundle arranged in a substantially circular fashion, the second fixed bundle comprising a second set of fibers, each one of the second set of fibers connectorized with a first type of connector at at least a second end; and a plurality of patch fibers, each one of the plurality of patch fibers having a third end and a fourth end and connectorized with a second type of connector at the third end and at the fourth end, each of the plurality of connectorized third ends being coupled to a corresponding connectorized end of the first fixed fiber bundle at the first end, wherein the plurality of ferrules are loaded from the ferrule conveyor arm onto the ferrule loader ring in an arbitrary, prescribed fashion by rotating the ferrule loader ring to a suitable position for each ferrule, and the loading piston is moved in a direction so that each of the plurality of the fourth ends is brought within contact or within a free-space coupling region of a corresponding connector in the second set of fibers. In another aspect, the first direction and the second direction are substantially orthogonal with each other. In a further aspect, the first direction and the second direction are non-overlapping. In a yet another aspect, the first type of connectors and the second type of connectors are adapted to mate with each other, for example, the first type of connector is a female and the second type of connector is a male, or vice versa.

In another embodiment, the present invention comprises a method of coupling a first fiber bundle with a second fiber bundle using a plurality of connectorized patch fibers, each patch fiber having a first end and a second end, in an arbitrary, prescribed manner using non-overlapping orthogonal motions, the method comprising the steps of connectorizing the first fiber bundle; arranging the connectorized first fiber bundle in a substantially circular fashion; securing the first ends of the plurality of connectorized patch fibers to the first fiber bundle; connectorizing the second fiber bundle; arranging the connectorized second fiber bundle in a substantially circular fashion; loading a ferrule conveyor arm with a plurality of ferrules; mounting a ferrule loader ring on a loading piston; loading the ferrule loader ring with the plurality of ferrules by driving the ferrule conveyor arm in a first direction; rotating the ferrule loader ring to a suitable position; driving a loading piston in a second direction, thereby bringing the ferrule loader ring in a position within contact or within a free-space coupling region; and making a connection between the second ends of the plurality of the patch fibers and a corresponding fiber at the position in the second fiber bundle.

In a further embodiment, the present invention comprises a method of providing uninterrupted service while reconfiguring robotic optical cross connect (ROXC), the method including the steps of: arranging a first ROXC and a second ROXC in a parallel, redundant fashion; connecting a first set of shutters to an output of the first ROXC; connecting a second set of shutters to an output of the second ROXC; splitting incoming traffic to pass through the first ROXC to the first set of shutters, and through the second ROXC to the second set of shutters; blocking traffic through the first set of shutters, allowing traffic to be routed only through the second set of shutters; reconfiguring the first ROXC; blocking traffic through the second set of shutters, allowing traffic to be routed only through the first set of shutters; and reconfiguring the second ROXC.

BRIEF DESCRIPTION OF THE DRAWINGS

These and other features, objects and advantages of the present invention are more readily understood from the following detailed description of the presently preferred embodiments with reference to the drawings, where like numbers designate like parts throughout the several views, and wherein.

DETAILED DESCRIPTION OF THE PRESENTLY PREFERRED EMBODIMENTS

Figure 1:
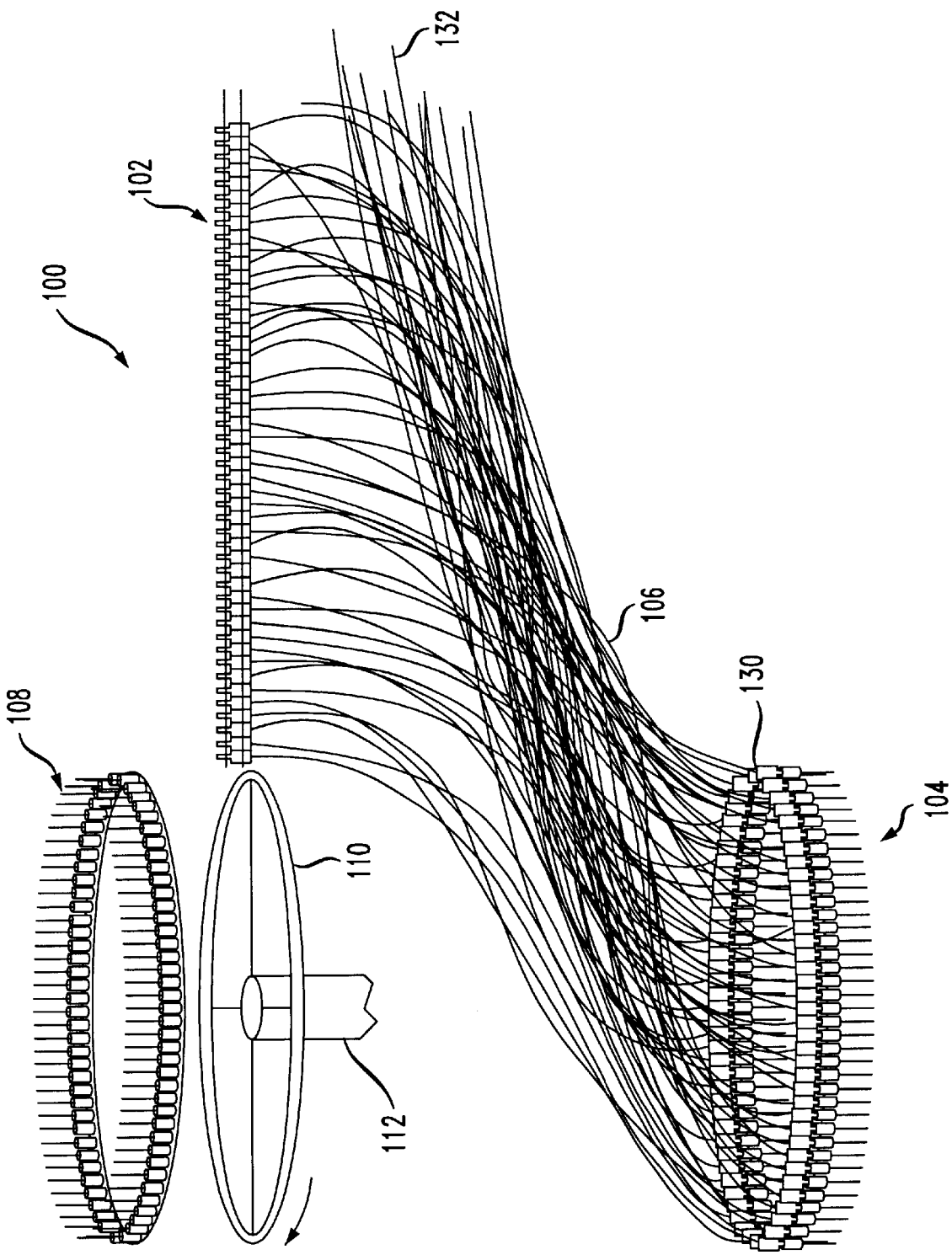
FIG. 1 depicts a preferred embodiment depicting a fixed input fiber bundle and a fixed output fiber bundle in a Robotic Optical Cross-Connect (ROXC) constructed according to the principles of the present invention.

Referring to FIG. 1, a Robotic Optical Cross-Connect (ROXC) 100 comprises a an assembler that includes a rotary ferrule loading ring 110 driven by a first motor (not shown) and a sequential ferrule conveyor 102, which is driven by a second motor (not shown). The rotary ferrule-loader ring 110 is mounted on a loading piston 112, which can be raised or lowered using a third motor (not shown).

In a preferred embodiment, the third motor that drives the loading piston 112 preferably imparts a vertical motion to piston 112, which vertical motion is applied to the ferrule loader ring 110, and the first motor preferably drives the sequential ferrule conveyor 102 in a horizontal direction. These motors and the motions are arranged in a way to achieve a non-overlapping, preferably orthogonal motion to the two components, the sequential ferrule conveyor 102 and the ferrule loader ring. In other embodiments, other configurations that allow a mutually non-overlapping motion between these two components (whether orthogonal or non-orthogonal) are possible.

The sequential ferrule conveyor 102 is loaded with a plurality of ferrules, which are preferably made of a ceramic material. Ceramic ferrules are a proven technology for connector performance because they meet the close tolerances required for optical fiber components. Therefore, a preferred embodiment includes ceramic ferrules. It should be noted, however, that ferrules made of other materials such as glass-filled polymers are also contemplated to be within the scope of this invention.

An input fiber bundle 104 is arranged in a substantially circular configuration. A plurality of patch fibers 106 is designed to mate with an output fiber bundle 108, which is preferably fixed and which is preferably arranged in a substantially circular fashion.

Each of the plurality of patch fibers 106 comprises a first end 130 and a second end 132 is coupled to an arm of the ferrule conveyor 102. The first end 130 and the second end 132 of each patch fiber 106 are connectorized (connectors not shown) using a method known to persons skilled in the art. In a preferred embodiment, the connectors on the input fiber bundle 104 and the output fiber bundle 108 are female and the connectors on the first end 130 and the second end 132 of the patch fibers 106 are male. In an alternative embodiment, a different configuration is possible. The free connectors on the patch fibers 106 are preferably simple fiber ferrules. The first end 130 of each patch fiber 106 is connected to the input fiber bundle 104 and the second end is free to mate with the output fiber bundle 108.

Figure 2:
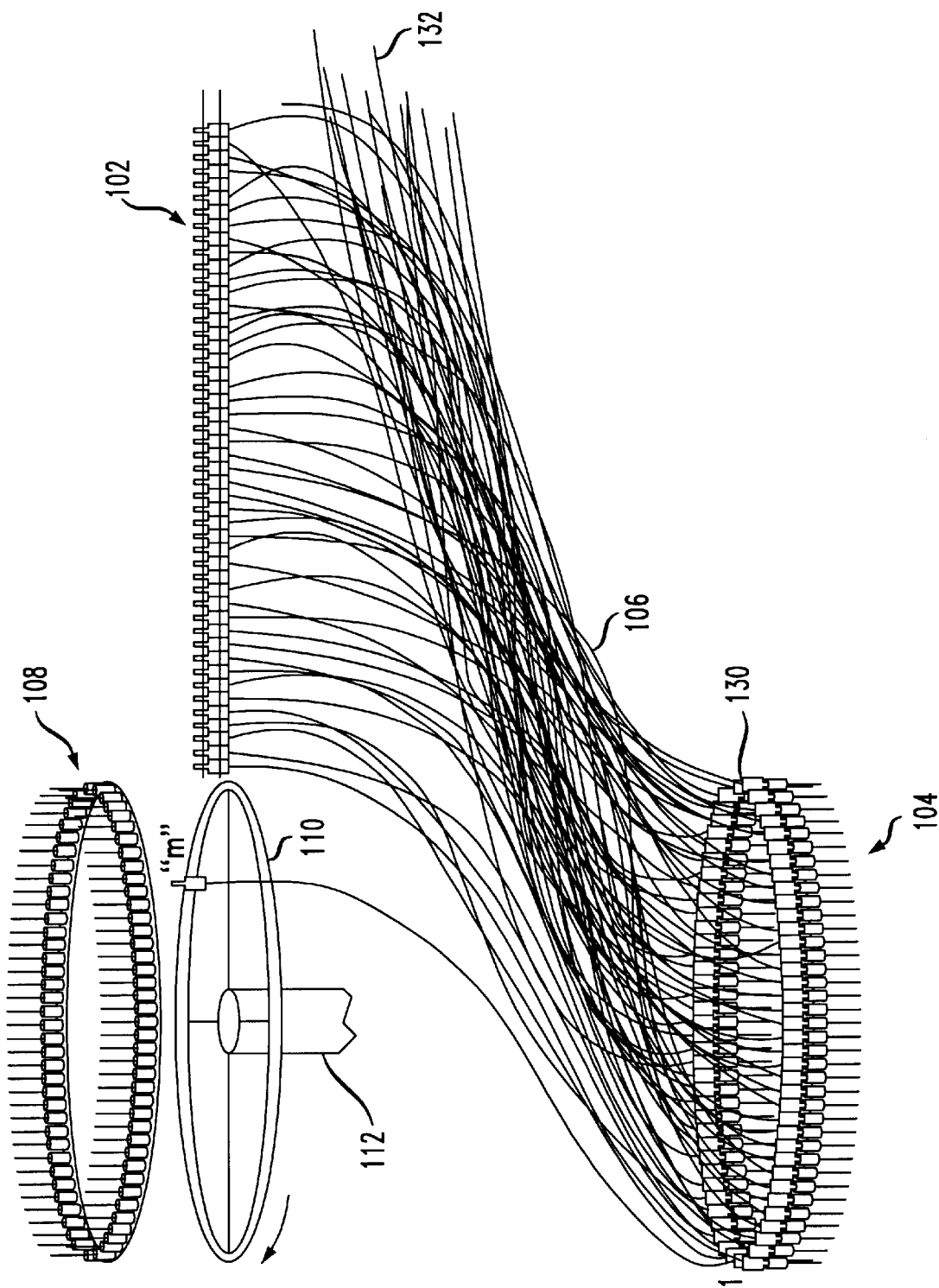
FIG. 2 depicts a ferrule loaded onto an output position in the ROXC of FIG. 1 using a ferrule loader (patch fibers not shown)
Figure 3:
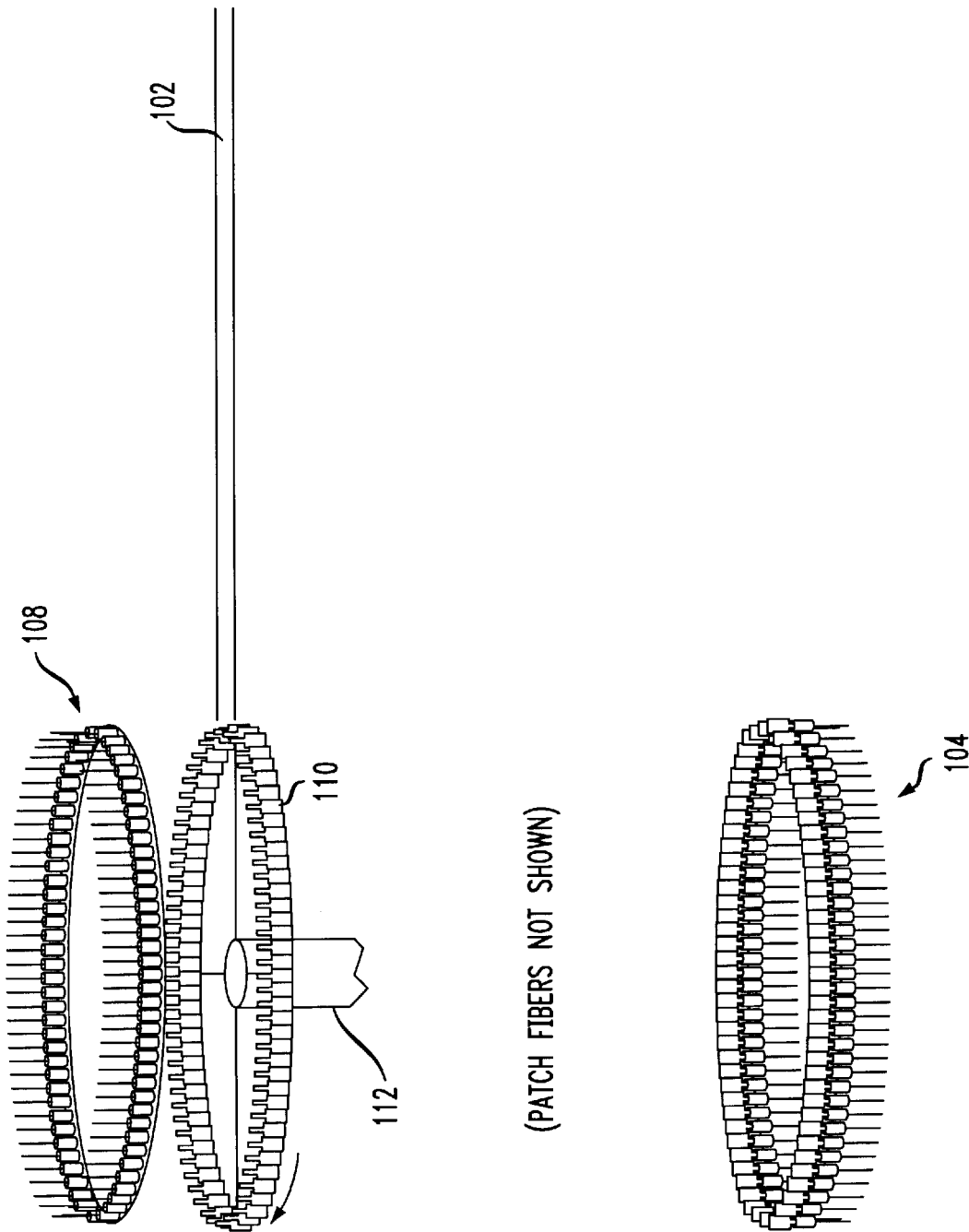
FIG. 3 depicts the ROXC of FIG. 1 fully loaded with ferrules using a ferrule conveyor (patch fibers not shown)

Referring to FIGS. 2–3, ferrules are loaded onto the rotary ferrule-loader ring 110 in an arbitrary, prescribed fashion by rotating the first motor to drive the rotary ferrule-loader ring 110 to a suitable position for each ferrule. FIG. 2 shows that an input fiber at position "1" loaded to an arbitrary output fiber position "m." This step is repeated until the rotary ferrule-loader ring 110 is fully loaded with ferrules as shown in FIG. 3.

Figure 4:
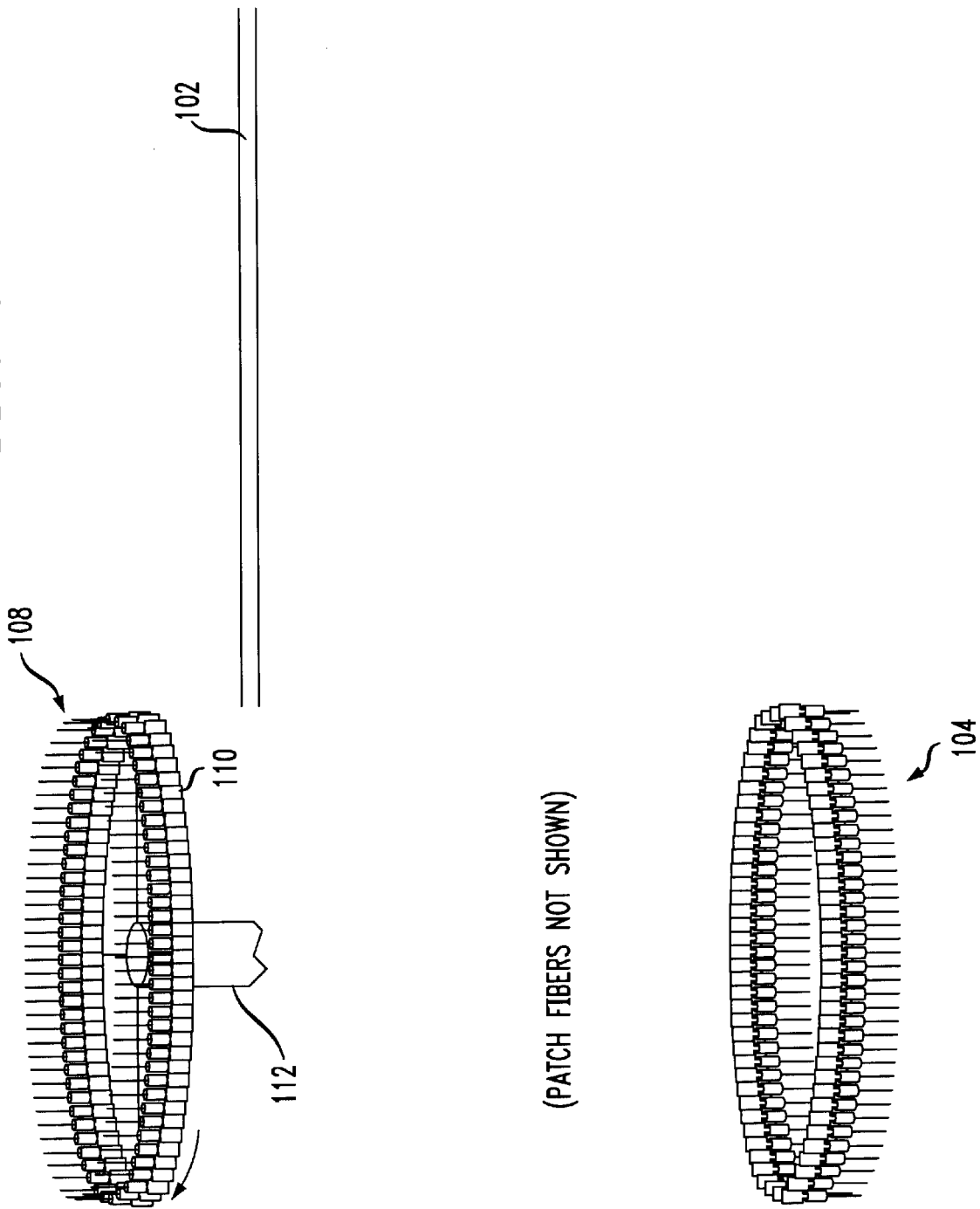
FIG. 4 illustrates the ROXC of FIG. 1 with a raised loading piston, bringing patch fibers (not shown) in contact or within a free-space coupling region of the fixed output fiber bundle.

Referring to FIG. 4, the output fiber bundle 108 is substantially coaxially aligned with the rotating ferrule loader ring 110 by raising the loading piston 112 using the third motor such that each of the ferrules is brought into a connection space—i.e., brought into contact or within a free-space coupling region—with a corresponding connection point on the output fiber bundle 108. Thereafter, a connection is preferably made and maintained by force of the loading piston 112 and the ferrules using a single manipulator (not shown).

It should be noted that, in a preferred embodiment, the connections thus made are relatively temporary, and are not made permanent by "snapping" the ferrules into place. Further, it should be noted that other methods of establishing connections such as splicing that are known to persons of ordinary skill in the art are also contemplated to be a part of this invention.

Referring still to FIG. 4, in a preferred embodiment, reconfiguring or rearranging a connection at a particular position is achieved as follows. The loading piston 112 is lowered, a ferrule from the position is unloaded, and the ferrule is reloaded in a new position. This method requires that, whenever the connection at the output fiber position "m" alone in a bundle of "N" fibers needs a reconfiguration, connections from m to N need to be broken. Such breakage of the connections from m to N may disrupt traffic through the ROXC. In a preferred embodiment, this problem is overcome as follows.

Figure 5:
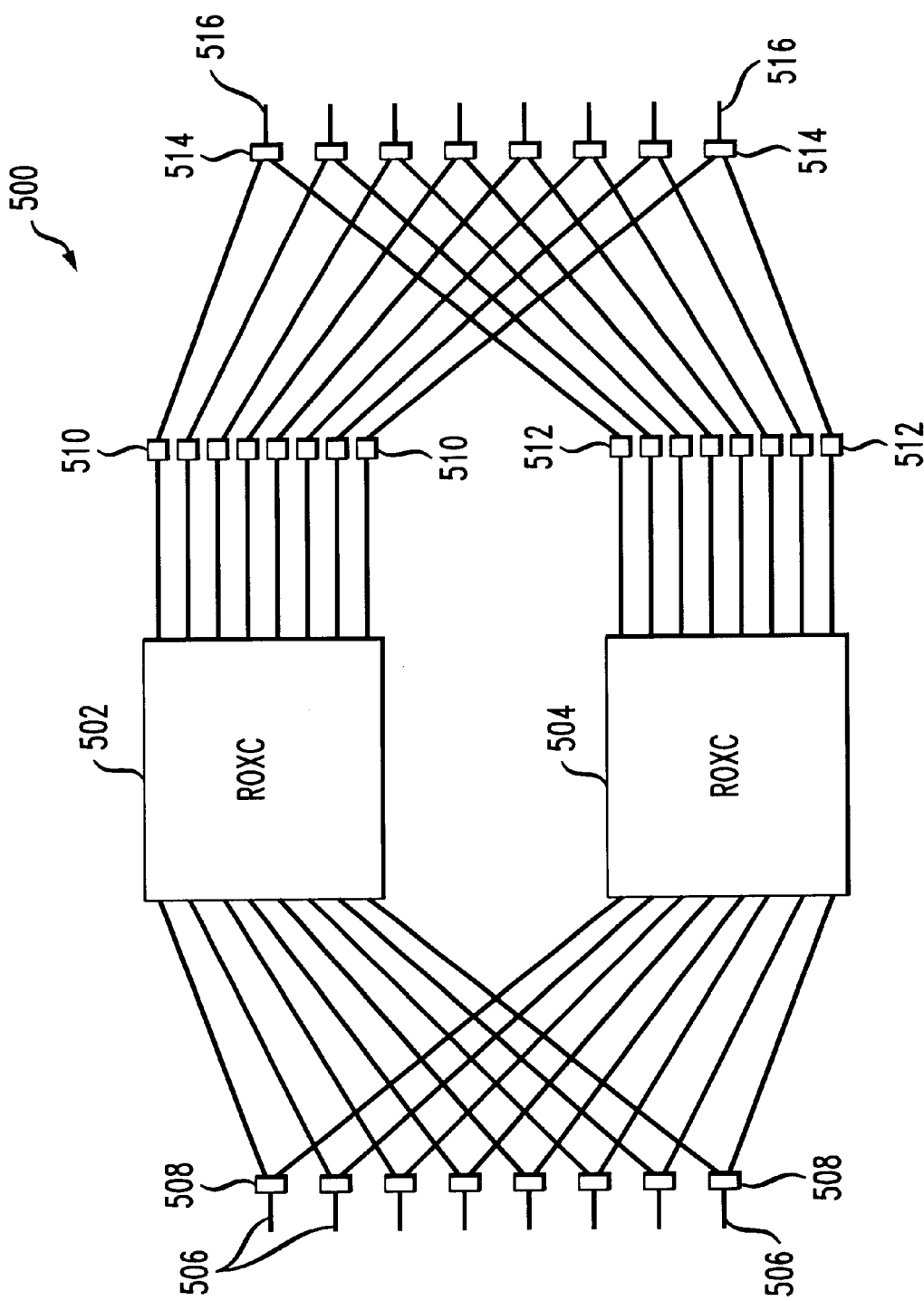
FIG. 5 depicts a redundant architecture comprising two ROXC fabrics that enables reconfiguration of each fabric without disrupting traffic.

Referring to FIG. 5, a parallel redundant set of non-blocking fabrics 500 preferably comprises two ROXCs, a first ROXC 502 and a second ROXC 504. Traffic from incoming lines 506 is split between the first ROXC 502 and the second ROXC 504 by utilizing power splitters 508. The first ROXC fabric 502 is coupled to a plurality of 1×0 switches 510, which are called shutters. The second ROXC fabric 504 is coupled to a plurality of shutters 512. Outputs from the plurality of shutters 510 and 512 are combined using power combiners 514 to form output line traffic 516.

During a normal operating mode, all the shutters 512 of one ROXC fabric, for instance those coupled to fabric 504, are closed, whereas the shutters 510 of the ROXC fabric 502 are kept open. When a reconfiguration is needed, the ROXC fabric 504 is reconfigured first. Thereafter, the shutters 512 are opened, and the shutters 510 are closed, whereupon the ROXC fabric 502 is reconfigured. This arrangement overcomes the problem of disruption during ROXC fabric reconfiguration.

When such a reconfiguration is performed, the non-reconfigured fabric may suffer a short power doubling in the time it takes the shutters to operate. This problem can be overcome by including an attenuator as a corrective measure.

The foregoing describes a robotic optical cross-connect that overcomes the problem of multiple motors required in Sjölinder by requiring only three motors for any size cross connect. Persons skilled in the art may make several modifications and rearrangements without departing from the spirit and scope of the invention or without undue experimentation. All such modifications and rearrangements should be construed as being within the scope of the appended claims.

What is claimed is:

1. A robotic optical cross-connect comprising:
   an assembler, comprising:
      a ferrule conveyor arm comprising a plurality of ferrules, the ferrule conveyor arm driven by a first motor in a first direction;
      a loading piston driven by a second motor in a second direction; and
      a ferrule-loader ring rotatably driven by a third motor, the ferrule loader ring mounted on the loading piston so as to receive a motion in the second direction;
   a first fixed fiber bundle arranged in a substantially circular fashion, the first fixed bundle comprising a first set of fibers, each one of the first set of fibers connectorized with a first type of connector at at least a first end;
   a second fixed fiber bundle arranged in a substantially circular fashion, the second fixed bundle comprising a second set of fibers, each one of the second set of fibers connectorized with a first type of connector at at least a second end; and
   a plurality of patch fibers, each one of the plurality of patch fibers having a third end and a fourth end and connectorized with a second type of connector at the third end and at the fourth end, each of the plurality of connectorized third ends being coupled to a corresponding connectorized end of the first fixed fiber bundle at the first end,
   wherein the plurality of ferrules are loaded from the ferrule conveyor arm onto the ferrule loader ring in an arbitrary, prescribed fashion by rotating the ferrule loader ring to a suitable position for each ferrule, and the loading piston is moved in a direction so that each of the plurality of the fourth ends is brought within contact or within a free-space coupling region of a corresponding connector in the second set of fibers.

2. The robotic optical cross-connect of claim 1, wherein the first direction and the second direction are substantially orthogonal with each other.

3. The robotic optical cross-connect of claim 1, wherein the first direction and the second direction are non-overlapping.

4. The robotic optical cross-connect of claim 1, wherein the first type of connectors and the second type of connectors are adapted to mate with each other.

5. The robotic optical cross-connect of claim 4, wherein the first type of connector is a female and the second type of connector is a male.

6. The robotic optical cross-connect of claim 4, wherein the first type of connector is a male and the second type of connector is a female.

7. A method of coupling a first fiber bundle with a second fiber bundle using a plurality of connectorized patch fibers, each patch fiber having a first end and a second end, in an arbitrary, prescribed manner using non-overlapping orthogonal motions, the method comprising the steps of:
   connectorizing the first fiber bundle;
   arranging the connectorized first fiber bundle in a substantially circular fashion;
   securing the first ends of the plurality of connectorized patch fibers to the first fiber bundle;
   connectorizing the second fiber bundle;
   arranging the connectorized second fiber bundle in a substantially circular fashion;
   loading a ferrule conveyor arm with a plurality of ferrules;

mounting a ferrule loader ring on a loading piston;

loading the ferrule loader ring with the plurality of ferrules by driving the ferrule conveyor arm in a first direction;

rotating the ferrule loader ring to a suitable position;

driving a loading piston in a second direction, thereby bringing the ferrule loader ring in a position within contact or within a free-space coupling region; and making a connection between the second ends of the plurality of the patch fibers and a corresponding fiber at the position in the second fiber bundle.

8. A method of providing uninterrupted service while reconfiguring robotic optical cross connect (ROXC), the method including the steps of:

arranging a first ROXC and a second ROXC in a parallel, redundant fashion;

connecting a first set of shutters to an output of the first ROXC;

connecting a second set of shutters to an output of the second ROXC;

splitting incoming traffic to pass through the first ROXC to the first set of shutters, and through the second ROXC to the second set of shutters;

blocking traffic through the first set of shutters, allowing traffic to be routed only through the second set of shutters;

reconfiguring the first ROXC;

blocking traffic through the second set of shutters, allowing traffic to be routed only through the first set of shutters; and reconfiguring the second ROXC.

* * * * *